United States Patent [19]
Seitz

[11] Patent Number: 5,269,068
[45] Date of Patent: Dec. 14, 1993

[54] PROTECTIVE DEVICE FOR A LONGITUDINALLY EXTENDING MACHINE COMPONENT

[75] Inventor: Karl Seitz, Oberkochen, Fed. Rep. of Germany

[73] Assignee: Carl-Zeiss-Stiftung, Heidenheim, Fed. Rep. of Germany

[21] Appl. No.: 947,155

[22] Filed: Sep. 18, 1992

[30] Foreign Application Priority Data

Sep. 18, 1991 [DE] Fed. Rep. of Germany ....... 4130990

[51] Int. Cl.⁵ .................... G01B 11/24; H01H 35/14
[52] U.S. Cl. ...................... 33/503; 33/558; 901/49; 200/508
[58] Field of Search ............ 33/503, 1 M, 556, 558, 33/559, 561; 901/13, 11, 49; 200/276, 508, 61.42, 61.43, 61.41

[56] References Cited

U.S. PATENT DOCUMENTS

| | | | |
|---|---|---|---|
| 2,138,549 | 11/1938 | Bell | 200/512 |
| 4,332,989 | 6/1982 | Nicolaisen | 901/49 |
| 4,365,188 | 12/1982 | Walter | 200/61.43 |
| 4,713,892 | 12/1987 | Strauss . | |
| 4,937,948 | 7/1990 | Herzog et al. | 33/556 |
| 4,964,221 | 10/1990 | Breyer et al. | 33/503 |
| 5,038,488 | 8/1991 | Abramowsky et al. . | |

FOREIGN PATENT DOCUMENTS

| | | | |
|---|---|---|---|
| 0012383 | 6/1980 | European Pat. Off. . | |
| 0116807 | 8/1984 | European Pat. Off. . | |
| 0229601 | 7/1987 | European Pat. Off. | 901/49 |
| 3527063 | 1/1986 | Fed. Rep. of Germany . | |
| 3514444 | 10/1986 | Fed. Rep. of Germany . | |
| 3532702 | 3/1987 | Fed. Rep. of Germany . | |
| 3833680 | 4/1990 | Fed. Rep. of Germany . | |
| 2555734 | 5/1985 | France | 33/503 |
| 2598485 | 11/1987 | France . | |
| 60-34572 | 2/1985 | Japan . | |
| 0049205 | 3/1987 | Japan | 33/503 |

*Primary Examiner*—William A. Cuchlinski, Jr.
*Assistant Examiner*—Alvin Wirthlin
*Attorney, Agent, or Firm*—Walter Ottesen

[57] ABSTRACT

A protective device includes at least one pair of conducting wires stretched tightly along a machine component. The wires are guided in cutouts in the partitioning legs of a bellows which at least partially covers the machine component. The shape or a metallization of the legs causes an electric contact to be made between the wires of the pair when the bellows and partitioning legs are displaced by transverse forces acting thereupon. In this way, the emergency circuit of the measuring apparatus can be actuated.

11 Claims, 4 Drawing Sheets

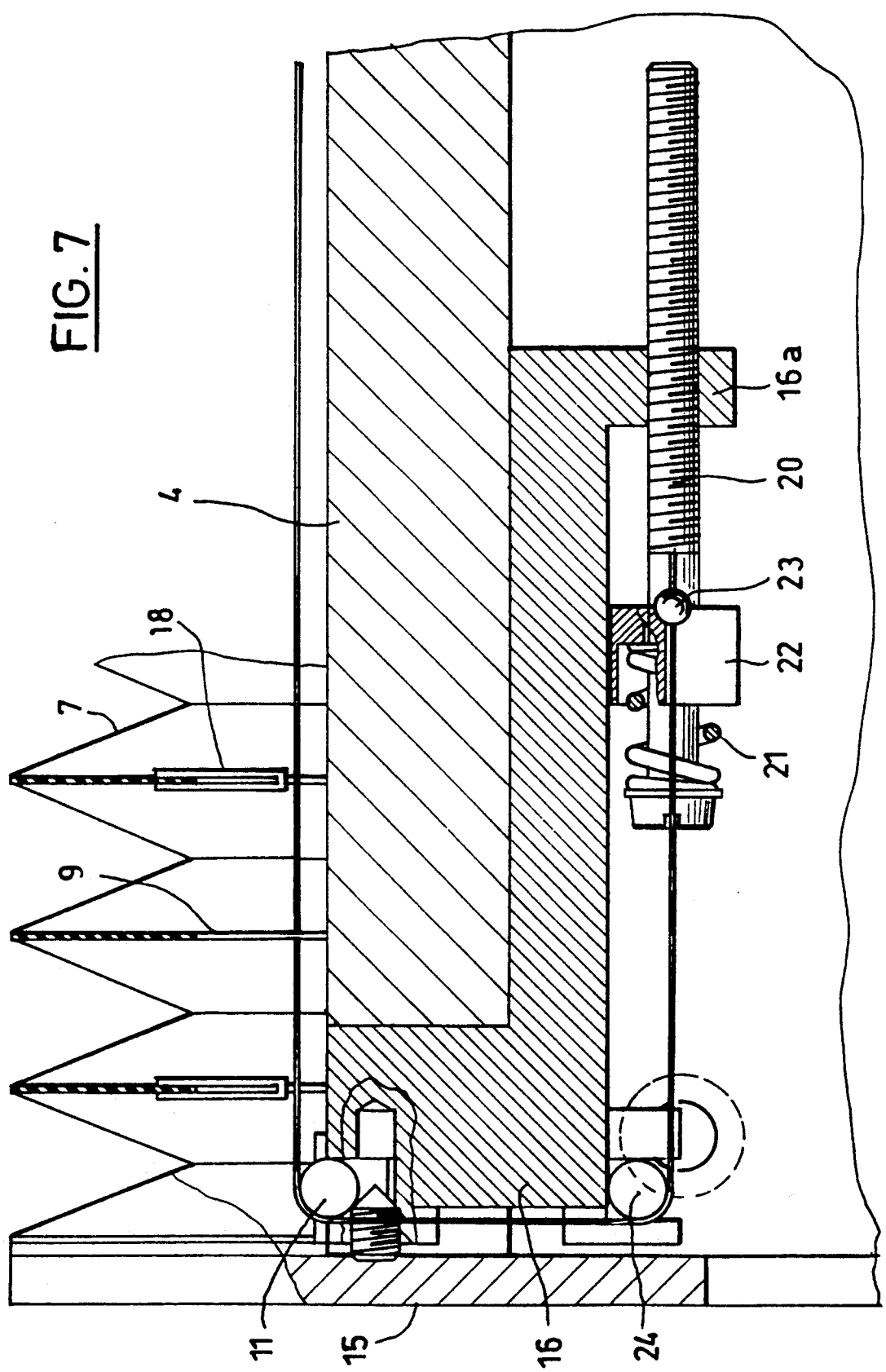

PROTECTIVE DEVICE FOR A LONGITUDINALLY EXTENDING MACHINE COMPONENT

BACKGROUND OF THE INVENTION

In machine technology and especially in the construction of coordinate measuring apparatus, it is often necessary to protect longitudinally extending, movable components which project into the work or measuring area against unintended collisions. Such machine components can be, for example, the measuring arm of the coordinate measuring apparatus which carries the measuring tool (probe head). Injury to operating personnel by the movable machine components is also to be prevented.

For this purpose, various protective devices are already known. For example, U.S. Pat. No. 4,713,892 discloses a protective device wherein an ultrasonic envelope is placed about the machine component to be protected. On the other hand, European patent publication 0,116,807 as well as German published patent application 3,514,444 disclose protective devices in the form of several light barriers which extend along the length of the machine component. The protective envelope is provided by a plurality of light barriers arranged one next to the other. When this protective envelope is penetrated, the electronic circuit to which the light barriers are connected supplies a signal to the emergency-stop control of the particular machine.

These known protective arrangements do operate very reliably; however, a plurality of light barriers arranged close one next to the other is required to provide the reliability of operation which is adequate. This configuration is needed since no gaps can occur in the protective envelope defined by the light barriers through which, for example, projections of the object to be measured can come into contact with the measuring arm and damage the latter.

It is also known to provide a plurality of spiral springs around the measuring arm of coordinate measuring apparatus to provide protection for this vertical arm. The spiral springs are at an electrical potential other than the metal machine component and the protective switch of the machine responds when there is contact with the machine component, for example, as in the course of a collision. This solution is however less suited for horizontally disposed machine components since the springs droop there and tend to oscillate thereby triggering false switching operations. Moreover, this solution is not usable for machine components made of aluminum having anodized surfaces because the non-conductive anodized surface prevents the electric short circuit between spring and machine component.

A protective device for the measuring arm of a coordinate measuring apparatus is described in U.S. Pat. No. 5,038,488 wherein two light barriers are guided through cutouts in the partition legs of a bellows surrounding the machine component. A displacement of the partition legs in the case of a collision interrupts the light barrier and the change of the light intensity announced by the detectors is processed further as a signal for the emergency control of the machine.

However, existing machines cannot easily be equipped with this protective device as larger bellows are required because of the necessary minimum dimensions for the light sources, detectors, the beam cross section etcetera and the measuring arm of the machine would therefore take up more space and the machine modified in this way could no longer follow the movement sequence programmed on the basis of the thinner arm. Furthermore, it is not simple for light barriers to maintain the beam direction and the beam intensity adequately constant over a long time duration.

SUMMARY OF THE INVENTION

In view of the above, it is an object of the invention to provide a protective device for longitudinally extending machine components movable in a direction transverse to the longitudinal direction and especially for the measuring arm of a coordinate measuring apparatus which provides a high measure of reliability with respect to disturbances at the least possible expense and which is suitable for retrofitting existing equipment.

According to the invention, the above object is realized with at least one pair of conductive wires stretched tightly along the machine component. The wires are guided in cutouts in the legs of a bellows covering the machine component at least in part. The shape of the cutouts and/or a metallization of the legs within the cutouts produces electrical contact between the wires of the pair when the bellows is displaced by transverse forces acting thereupon.

Since each signal is obtained from a short circuit of two wires tensioned in pairs, the protective device is suited also for machine components made of non-conductive material or machine components having non-conductive surfaces such as anodized aluminum. The protective device does not take up much space so that the dimensions of the machine component or of its bellows can be maintained; that is, a larger bellows is not required. The protective device is furthermore universally usable in a perpendicular position as well as in a horizontal position and can be manufactured at low cost and presents little complexity for assembly. The protective device of the invention affords excellent long-term stability since optoelectronic components and the inherent drifts and aging effects associated therewith are avoided.

It is advantageous to provide a tensioning device for tensioning the wires and to arrange this device in the interior of the machine component which usually is hollow in order to ensure the functional reliability over the entire length of the machine component. The wires are then guided over redirect rollers at the forward and rearward end of the measuring arm.

It is advantageous to guide the wire pairs in V-shaped or lozenge-shaped cutouts to ensure a reliable contact between the wire pairs for very different collision directions that can act on the machine component. The form of the cutouts ensures that the wires of the wire pair come into mechanical contact. The same result is also obtained when the legs of the bellows are provided on one or more sides with conductive clamps, preferably, copper clamps.

It is especially advantageous when both measures are taken simultaneously and the legs of the bellows following one behind the other are alternately provided with lozenge-shaped or V-shaped cutouts and conductive clamps.

BRIEF DESCRIPTION OF THE DRAWINGS

The invention will now be described with reference to the drawings wherein:

FIG. 7 is a section view taken along line VII—VII of FIG. 6 through the forward end of the measuring arm; and, FIG. 8 is a detail view of a part of the partitioning leg of a bellows having a cutout according to another embodiment of the invention.

DESCRIPTION OF THE PREFERRED EMBODIMENTS OF THE INVENTION

Figure 1:
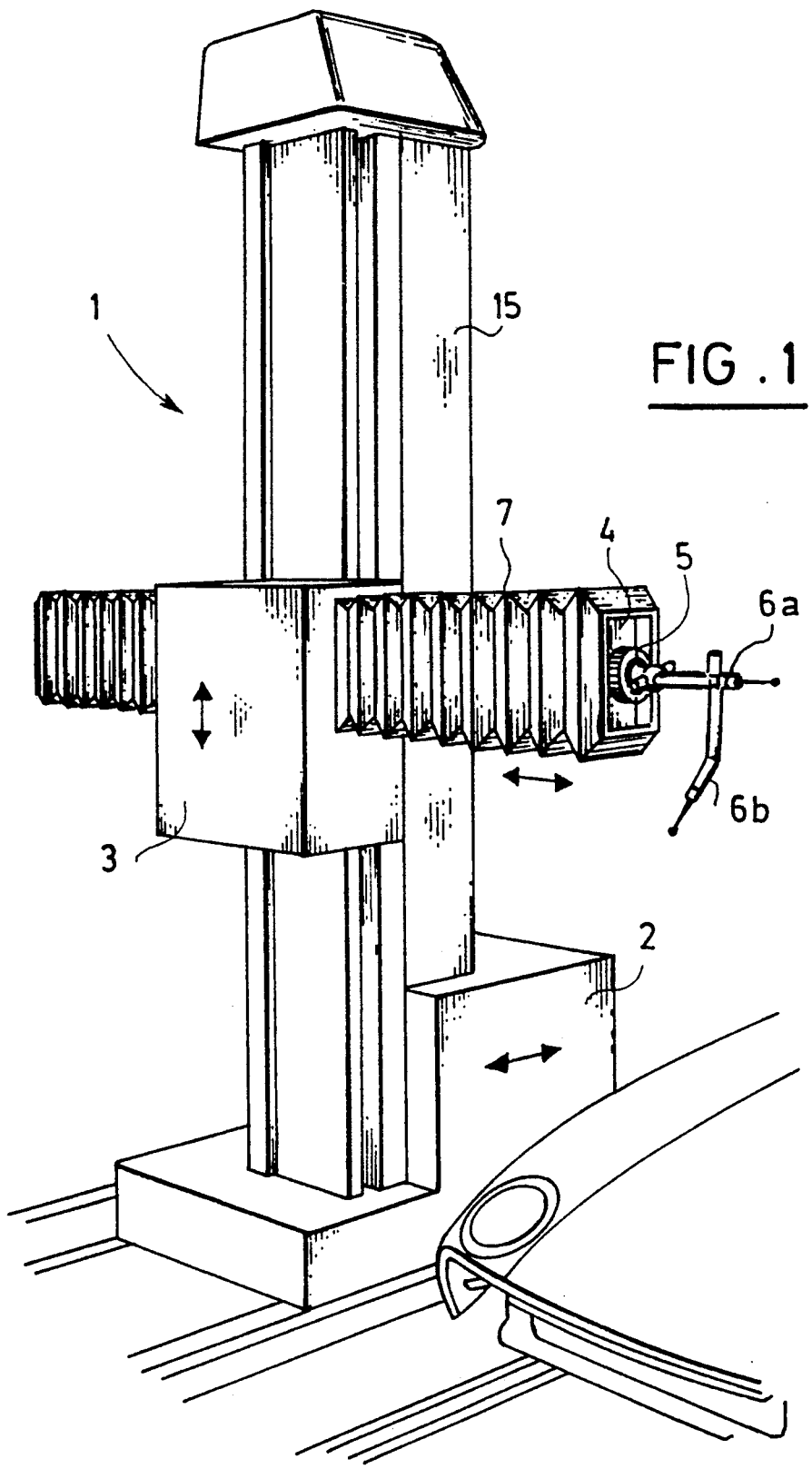
FIG. 1 is a perspective view of a coordinate measuring apparatus configured in the form of a stand and equipped with a protective arrangement according to the invention.

FIG. 1 shows a coordinate measuring apparatus 1 having a stand-like configuration. The base 2 of this apparatus is movable in the horizontal direction along guides embedded in the foundation. A slide 3 is displaceably journalled on the stand 15 of the apparatus 1 for displacement in elevation. The slide 3, in turn, accommodates the transverse arm 4 displaceable with respect to the slide 3 in the horizontal direction and along its longitudinal axis. The transverse arm 4 is the actual measuring arm of the coordinate measuring apparatus and carries a holder 5 on its end face for different probes (6a and 6b) with which the object to be measured is measured by contacting the latter with the probes.

The guides (not shown) of the transverse arm 4 are covered by the bellows 7 in the region thereof in which the transverse arm 4 projects outwardly from the slide 3. Accordingly, the parts of the bellows 7 covering the forwardly and rearwardly projecting ends of the transverse arm 4 expand and collapse with each movement of the transverse arm 4 in its longitudinal direction.

The machine also moves the transverse arm 4 with high speed laterally in accordance with the measuring program, that is, perpendicularly to its longitudinal direction as well as in elevation. For this reason, unintended collisions can occur with objects placed in the measuring area and with the object to be measured itself when the programming is incorrect. Collisions can also occur with unattentive operating personnel.

Figure 2:
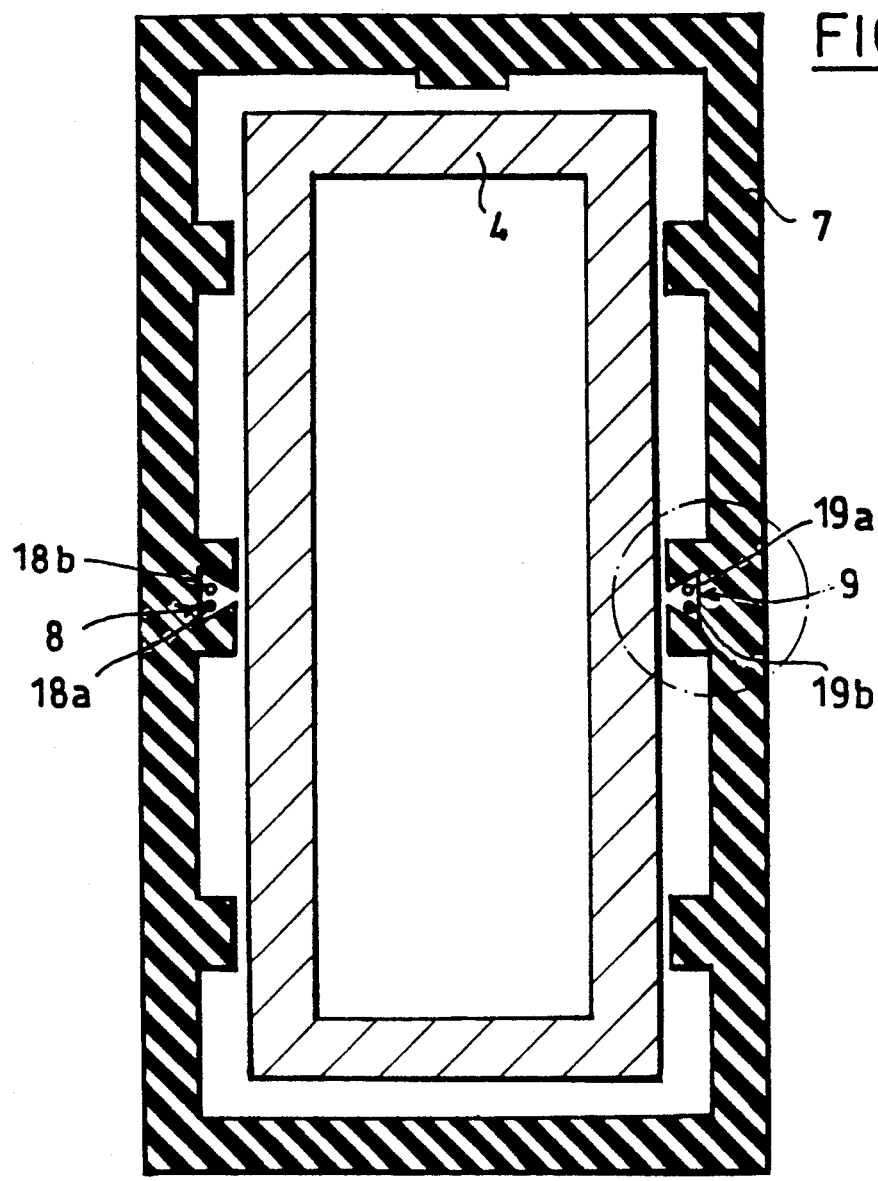
FIG. 2 is a segment of the measuring arm of the apparatus of FIG. 1 shown in an enlarged scale.

In order to avoid the above, and as shown in FIG. 2, the partitioning legs 12 of the bellows 7 have punched cutouts 8 on one side aligned with each other and cutouts 9 on the other side also aligned with each other. In the embodiment described, two rows of punched cutouts (8, 9) are provided on mutually opposite lying sides of the transverse arm 4.

Figure 3A:
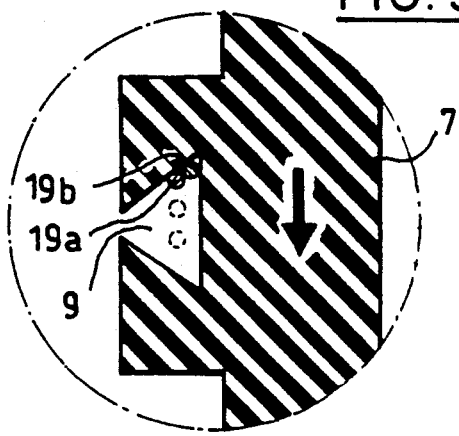
FIGS. 3a to 3c are enlarged detail views of that portion of the partitioning leg containing the cutouts in which the wires are guided with each of the three views showing a force acting on the bellows in a different direction.
Figure 3B:
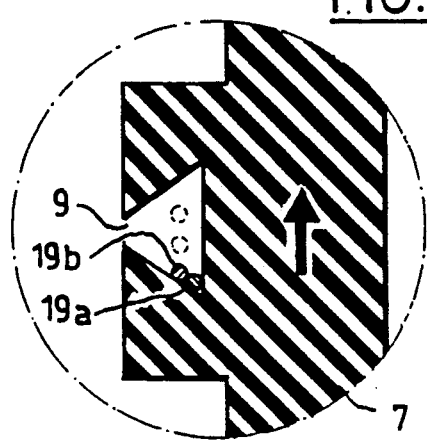
Figure 3C:
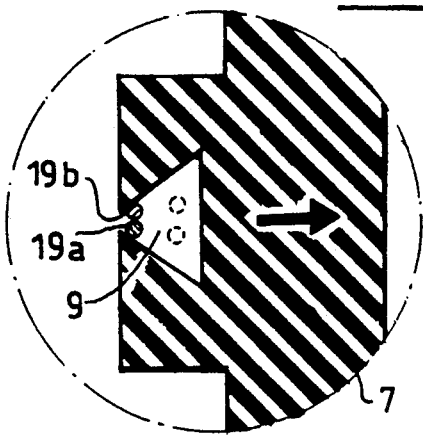

As shown in FIGS. 3a to 3c, the punched cutouts have a lozenge shape or V shape with each cutout surrounding two wires (18a, 18b) or (19a, 19b) which are tightly stretched at a small spacing one above the other along the length of the transverse arm 4.

Figure 6:
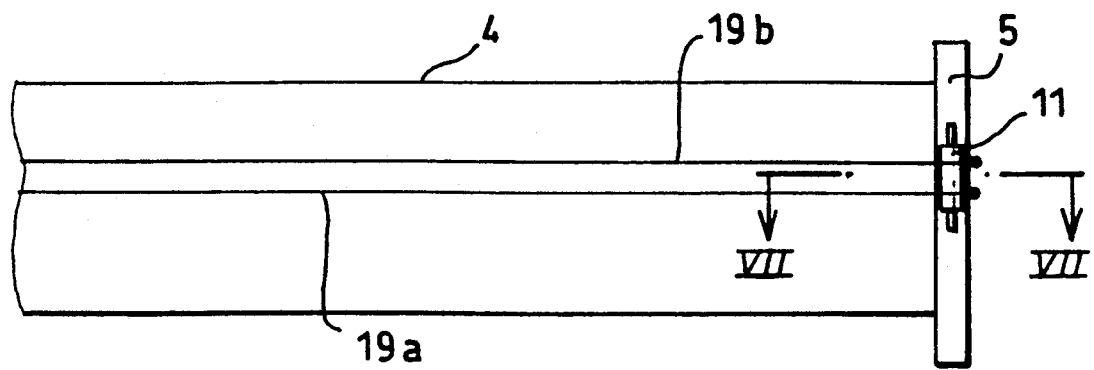
FIG. 6 is a side elevation view of the measuring arm of the coordinate measuring device for which the bellows has been removed.

The two wires (18a, 18b) or (19a, 19b) of each pair are guided over redirect rollers at both ends of the transverse arm and are tightly tensioned at the forward end on the holder 5 for the probe head of the measuring apparatus by a tensioning device mounted in the interior of the transverse arm. The wires are so tightly tensioned by the tensioning device that they do not significantly droop over the length of the transverse arm which is approximately 2 m and do not touch each other without being influenced from the outside. As shown in FIG. 6, the wires (19a, 19b) are connected to a collision protection circuit 40.

The tensioning device is shown in FIG. 7 and comprises a set screw 20 for adjusting the spring force. The set screw is threadably engaged in a threaded bore 16a in an insert part 16 at the forward end of the transverse arm 4. The set screw 20 is directed parallel to the axis of the transverse arm. A pressure spring 21 is disposed around the set screw 20 which is braced with its one end against a pressure piece 22 made of insulating material. The pressure piece 22 is disposed coaxially over the set screw. Each of the wires has a thickened end 23 which is hooked in a notch of the pressure piece 22. Each of the wires is guided over redirect rollers (11, 24) which are likewise insulating. A similar device is provided for the other wire pair (18a, 18b).

The two wires of each pair (18a, 18b; 19a, 19b) are connected to the emergency control of the coordinate measuring apparatus via an electronic circuit (not shown). In the normal case, that is, when no lateral forces are applied to the bellows 7, the two wire pairs are suspended in the center of the V-shaped recesses as shown in phantom outline in FIGS. 3a to 3c.

The application of external forces such as during a collision causes the partition legs 12 of the bellows 7 to be displaced at the particular location where the collision occurs. The V-shaped configuration of the cutouts 9 in the partition leg causes the conducting wire to be brought into contact with each other in the apexes of the cutouts. The contacting wires then function as an electrical switch and announce the short circuit. This case is shown in FIG. 3a for a force acting on the bellows from above. FIG. 3b shows the case for force acting from below and FIG. 3c shows the case of a force moving the bellows away from the transverse arm.

Figure 4:
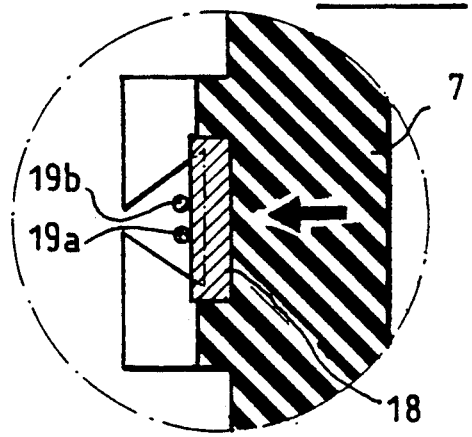
FIG. 4 is an enlarged detail view of a portion of the partitioning leg provided with a conductive clamp.

Each second partition leg of the bellows is provided with a conducting copper clamp 18 at the location where the wires run in order to make a reliable contact in the case of forces which act laterally on the bellows as shown in FIG. 4. These conducting copper clamps ensure that contact is made even for forces directed laterally toward the guide path as shown in FIG. 4.

In the embodiment described above, the contact is achieved by the combination of appropriately shaped cutouts in some of the partition legs and by metallization of the cutouts on one side in the remaining partition legs. However, it is also possible to provide an adequately good contact for all occurring collisions alone by the metallization of the cutouts.

Figure 8:
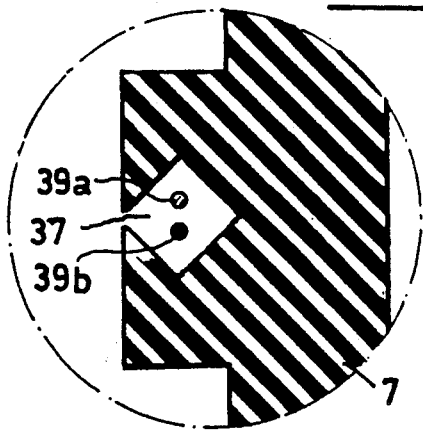
Figure 5:
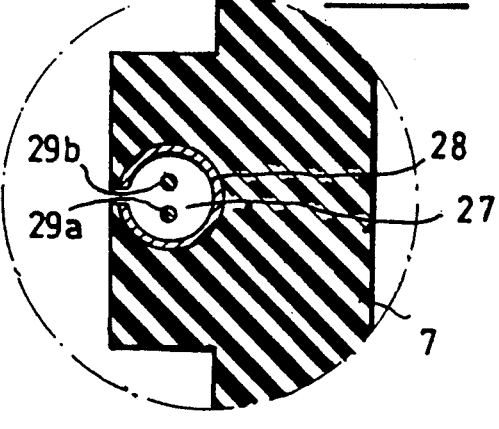
FIG. 5 is an enlarged detail view of a part of the partitioning leg of a bellows having conductive clamps according to another embodiment of the invention.

For this purpose, and as shown in the alternate embodiment of FIG. 5, ring-shaped cutouts 27 having a conductive copper ring 28 or lozenge-shaped cutouts 37 can be used (FIG. 8). Wires 29a and 29b are shown in ring-shaped cutout 27 and wires 39a and 39b are shown in lozenge-shaped cutout 37.

In both cases, all possible collision directions are covered with relatively few wire pairs such as with two wire pairs.

In the above embodiments, a protective device for the horizontal measuring arm of a coordinate measuring apparatus mounted on a stand is described. However, the protective device can be used in the same manner also for other types of machines such as for the vertical measuring arm of coordinate measuring apparatus having a portal or bridge configuration or, for example, for processing machines.

It is understood that the foregoing description is that of the preferred embodiments of the invention and that various changes and modifications may be made thereto without departing from the spirit and scope of the invention as defined in the appended claims.

What is claimed is:

1. A protective device for an elongated machine component defining a longitudinal axis and being movable in a direction transversely to said axis, the protective device comprising:

a bellows extending in the direction of said axis and at least partially covering the machine component;

said bellows having a plurality of structural parts made of electrically insulating material and being displaceable in response to a force acting on said bellows in a direction transverse to said axis;

a plurality of cutouts formed in corresponding ones of said structural parts;

a pair of electrically conductive wires guided in said cutouts along said machine component in the direction of said axis;

tensioning means for applying a tensioning force to said wires for holding said wires taut within said cutouts;

said two wires both passing together through each of said cutouts; and, contact making means for bringing said wires into electrical contact with each other in response to said force.

2. The protective device of claim 1, said wires extending over the entire length of said machine component; said tensioning means comprising a tensioning device for adjusting the tension in said wires; said tensioning device being mounted within said machine component and connected to said wires; and, redirect roller means for guiding said wires to said tensioning device.

3. The protective device of claim 1, said contact making means comprising a shape of said cutouts which pushes said wires together to make direct electrical contact with each other within at least one of said cutouts as the structural part corresponding to said one cutout is moved transversely relative to said wires and said axis.

4. The protective device of claim 3, said shape of said cutout being a V-shape.

5. The protective device of claim 3, said shape of said cutout being a lozenge shape.

6. The protective device of claim 1, said cutouts each having a peripheral edge defining the shape of the cutout; said contact making means comprising a metal eyelet covering said edge so as to make electrical contact between said wires when said wires come into mechanical contact with said metal eyelet in response to the displacement of the structural part.

7. The protective device of claim 1, said cutouts each having a peripheral edge defining the shape of the cutout; said contact making means comprising a metal clamp clamped to said edge so as to make electrical contact between said wires when said wires come into mechanical contact with said metal clamp in response to the displacement of the structural part.

8. The protective device of claim 1, said cutouts each having a peripheral edge defining the shape of the cutout; said structural parts being arranged one behind the other along the length of said machine component; said contact making means comprising said shape being formed in every other one of said structural parts so as to push said wires together to make electrical contact with each other when at least one of said every other one of said structural parts is displaced transversely with respect to said axis; and, said contact making means further comprising metal means covering at least a portion of said edge in the cutouts of the remaining ones of said structural parts so as to make electrical contact between said wires when said wires come into mechanical contact with said metal means when at least one of said remaining ones of said structural parts is displaced transversely with respect to said axis.

9. The protective device of claim 8, said shape in said every other one of said structural parts being a V-shape and said metal means being a metal clamp.

10. The protective device of claim 8, said shape in said every other one of said structural parts being a lozenge shape and said metal means being a metal clamp.

11. The protective device of claim 1, said machine component being the measuring arm of a coordinate measuring apparatus having a collision protection circuit and said wires being connected to said collision protection circuit.

* * * * *